(12) United States Patent
Chu et al.

(10) Patent No.: US 7,907,550 B1
(45) Date of Patent: Mar. 15, 2011

(54) METHOD AND SYSTEM FOR PROVIDING VOICE OVER IP CONFERENCING SERVICE

(75) Inventors: Yue-Chuan Chu, Morristown, NJ (US); Ningming Hua, Rockaway, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1189 days.

(21) Appl. No.: 10/099,983

(22) Filed: Mar. 19, 2002

(51) Int. Cl.
*H04L 12/16* (2006.01)
*H04L 12/66* (2006.01)
*H04L 12/28* (2006.01)

(52) U.S. Cl. .................. 370/260; 370/356; 370/400

(58) Field of Classification Search .................. None
See application file for complete search history.

(56) References Cited

U.S. PATENT DOCUMENTS

| | | | |
|---|---|---|---|
| 6,141,341 A | 10/2000 | Jones et al. | |
| 6,269,159 B1 * | 7/2001 | Cannon et al. | 379/202.01 |
| 6,337,858 B1 | 1/2002 | Petty et al. | |
| 6,654,455 B1 * | 11/2003 | Isaka | 379/202.01 |
| 6,654,456 B1 * | 11/2003 | Mandalia et al. | 379/220.01 |
| 6,785,246 B2 * | 8/2004 | Foti | 370/261 |
| 6,816,469 B1 * | 11/2004 | Kung et al. | 370/260 |
| 6,847,618 B2 * | 1/2005 | Laursen et al. | 370/261 |
| 6,961,416 B1 * | 11/2005 | Summers et al. | 379/202.01 |
| 6,965,767 B2 * | 11/2005 | Maggenti et al. | 455/416 |
| 2002/0103864 A1 * | 8/2002 | Rodman et al. | 709/204 |

* cited by examiner

*Primary Examiner* — Melanie Jagannathan

(57) ABSTRACT

The present invention relates to a method and system for providing conference call services in a VoIP local network. A VoIP communication station may be conferenced into a VoIP call between at least two other communication stations. In one embodiment, a Voice Conference Server device (VCS) receives a "join-call" signal or indication from a VoIP phone wishing to conference into a VoIP connection. The VoIP connection may be between at least one VoIP phone in a local network and a communication station such as a PSTN phone in a public network. The VCS sets up an RTP voice path and conferences in the VoIP communication station providing the "join-call" signal or indication.

27 Claims, 4 Drawing Sheets

METHOD AND SYSTEM FOR PROVIDING VOICE OVER IP CONFERENCING SERVICE

TECHNICAL FIELD

The present invention relates to a method and system for providing Voice over Internet Protocol (VoIP) conference services and in particular to providing VoIP conference services in a LAN based private networking environment.

BACKGROUND OF THE INVENTION

Internet Protocol telephone systems are used to place and receive VoIP-based telephone calls. Users may access the Internet via services in their home or business via an entry/exit point or a gateway. Such VoIP service may be provided in a LAN home network. VoIP stations within a LAN home network may connect with VoIP or PSTN phones in a public network through the entry/exit point or the gateway. Through such a Gateway, IP based voice services may be delivered to VoIP stations in the home network such that the VoIP stations in the home network may communicate with the public network via data transmitted over a network through paths in digital data packets that traverse routers in the network to arrive at a desired destination over IP protocols. The actual voice stream is carried by the Real-Time Transport Protocol (RTP). The IP address and port number information for the RTP packets are defined by the Session Description Protocol (SDP).

A need often arises to initiate a conference call in a VoIP network. For example, a party in a private network may desire to join in a call already in progress between another party within the private network and a party in a public network. However, to set up a conference call in a VoIP network, an active VoIP station typically initiates the conference call connection. For example, if an active VoIP station desires a second VoIP station within the network to participate in a call, the active VoIP station sends a request to conference in the second VoIP station to a call agent. This may be accomplished by a user pressing a conference call button at the active VoIP station. On receipt of the conference call request from the call agent, the second VoIP station receives the request and answers the call. In this way, the second VoIP station is joined in the call.

In a typical wired-line home environment involving, for example, standard PSTN phones, a third party in the private network may join a conversation by simply picking up an extension line. If a conversation is already in progress, for example, between a party in the private network and a second party, the third party who is within the private network may easily and efficiently join the conversation. However, in a VoIP environment, this is not the case. If a third party on a VoIP phone and network wishes to join a VoIP call already in progress, the third party typically needs to be included in the call via conferencing capability. For example, a user may need to dial a number to set up a conference call. This causes inconvenience and delays in joining a connection on a VoIP call network as compared to joining a conversation on a PSTN network using a standard PSTN phone.

Typically, a voice client, such as a VoIP station or VoIP phone with wired or wireless LAN interface may originate and receive VoIP phone calls independently from other voice clients in the private network. An active VoIP station may be engaged in a VoIP connection with a communication station in a public network while other VoIP stations or VoIP phones in the private network typically do not participate in the conversation. However, if other VoIP stations in the same private network wish to join in the conversation, the active VoIP station may initiate a conference call with the VoIP stations wishing to join in the conversation resulting in a conference call for each new station joining in the conversation. This requires each VoIP phone to have complex hardware to implement the conferencing capability, which tends to increase costs. Furthermore, a VoIP station wishing to participate in the conversation is typically unable to efficiently join in the conversation to establish a conference call as in wired-line home environment.

There is currently no efficient method or system for VoIP conference calling in a private network such that a VoIP station in a private network may easily join a call in progress between another VoIP station in the private network and a station in a public network.

Thus there exists a need in the art to provide VoIP conference services in a private networking environment such that a user may conveniently, efficiently, and cost-effectively join in a VoIP connection.

SUMMARY OF THE INVENTION

The present invention relates to a method for establishing a VoIP conference call by joining a first VoIP station in a communication between a plurality of communication stations, wherein at least one of the plurality of communication stations is a second VoIP station in a private network and said first VoIP station is in the private network, the method comprising receiving an indication from the first VoIP station for joining a VoIP call between the plurality of communication stations, establishing an RTP voice path with the first VoIP station and managing data packet transmission between the first VoIP station and the plurality of communication stations.

In another embodiment of the present invention, a device is provided for establishing a VoIP conference call by joining a first VoIP station in a communication between a plurality of communication stations, wherein at least one of the plurality of communication stations is a second VoIP station in a private network and said first VoIP station is in the private network, the device comprising a receiver for receiving an indication from a first VoIP station for joining a call, an apparatus for setting up a voice path with the first VoIP station in response to the received signal for joining a call and an RTP mixer for managing at least two VoIP stations and sending the mixed data packets to at least one VoIP station.

DETAILED DESCRIPTION OF THE INVENTION

Figure 1:
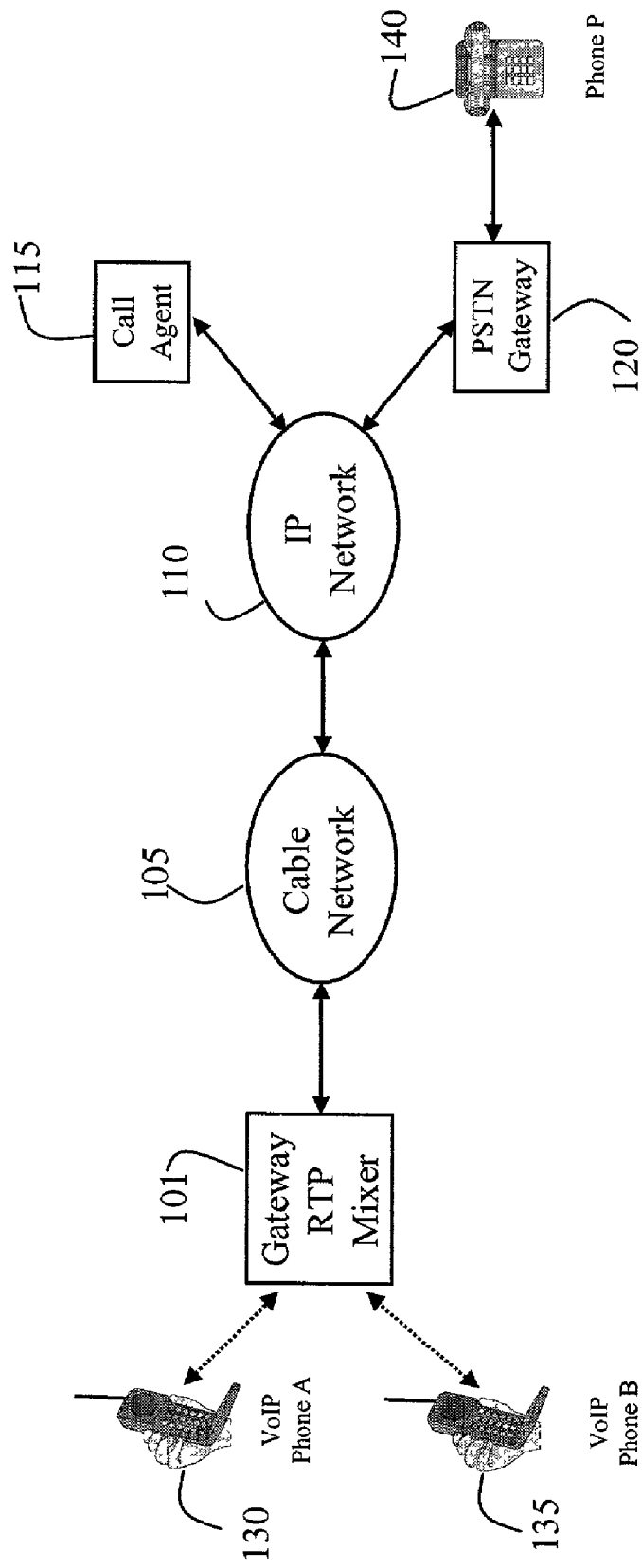
FIG. 1 is a block diagram illustrating an exemplary network with a Gateway for establishing VoIP conference calling of the present invention.

The present invention relates to a method and system for providing Voice over IP conference service to a wired or wireless private network. In a wired or wireless LAN (IEEE 802.11) home network, for example, voice service may be provided via VoIP technology. Data, such as packets associated with Voice-over-IP (VoIP) service between networks may be properly routed through a network according to specific IP address and/or port number information. For proper delivery of data packets to a desired node in a network, a gateway may be utilized for receiving data packets from a public network, such as the Internet for example, and routing the data packets to the desired node in the private network. The gateway may serve as an intermediary to establish contact between clients in a private network and a VoIP call agent in a public network.

In one embodiment of the present invention, a device such as a Voice Conference Server (VCS) is used for solving the above mentioned problems. In this embodiment, the conference call capability is contained in the VCS. By placing conferencing call capability in the VCS rather than in the VoIP phone, costs for the VoIP phone are contained. The device may contain a software-based solution and may reside at the Gateway to provide conferencing capability in VoIP networks. For example, a first VoIP communication station such as a VoIP phone in a private network may desire to join in an existing VoIP connection between a second VoIP communication station such as a second VoIP phone in the private network and a communication station such as a PSTN phone in a public network. The first VoIP phone goes off hook and a signal is generated to indicate the desire to join the conversation between the second VoIP phone and the phone in the public network. For example, a switch on the first VoIP phone may be triggered such that a "join-call" signal may be sent to the VCS indicating that the first VoIP phone wishes to join in the connection. Alternatively, a special key may be used on the first VoIP phone to indicate that the first VoIP phone wishes to join in the connection or a special code may be entered at the first VoIP phone. It should be noted that there are many methods of generating an indication that the first VoIP phone wishes to join in the connection and the examples enumerated herein are merely illustrative and not limiting. It is envisioned that one of skill in the art may use a variety of methods without departing from the spirit and scope of the present invention.

Upon detection of an indication or signal that the first VoIP station wishes to join in the connection, the VCS may set up a voice path with the first VoIP station such that an RTP path for carrying voice will be established between the VCS and the first VoIP station. An RTP mixer may be employed to mix voice data packets from any combination of communication stations in the network and forward the mixed packets to the intended destination. For example, the RTP mixer may mix voice packets from the first VoIP phone and the second VoIP phone and forward the mixed packets to the phone in the public network or the RTP mixer may mix voice packets from the first VoIP phone and the phone in the public network and send the mixed packets to the second VoIP phone or the RTP mixer may mix voice packets from the second VoIP phone and the phone in the public network and forward the mixed packets to the first VoIP phone. It should be noted that although two VoIP phones are described in this exemplary embodiment, any number of VoIP phones may be involved in the conference call such that the RTP mixer may mix packets from any number of communication stations and forward the mixed packets to any communication station participating in the call.

When the first VoIP phone enters the conversation, the communication stations originally involved in the connection (the second VoIP phone and the phone in the public network, in this example) are informed that the new communication station (the first VoIP phone, in this example) is entering the conversation. This process may be repeated with multiple communication stations. For example, a third VoIP phone may wish to enter the conversation as well. In this case, the third VoIP phone sends a signal to the VCS indicating that the third VoIP phone wishes to join in the connection. As with the first VoIP phone, the "join-call" indication is received at the VCS and an RTP path for carrying voice is established between the third VoIP phone and the VCS and the RTP mixer mixes packets from the third VoIP phone to establish a conference call. The existing communication stations in the connection are informed of the new communication station (the third VoIP phone, in this example) joining the call. Likewise, if any communication station leaves the connection (i.e., goes "on-hook"), the communication stations remaining in the connection may be informed that the communication station leaving the connection has left. When a communication station leaves the conversation, a "on-hook" signal may be transmitted from the communication station that is leaving to the VCS. The VCS receives the "on-hook" signal or indication and releases the connection to the communication station that is leaving. In one embodiment, if any of the secondary communication stations (first VoIP phone or third VoIP phone, in this example) leave the conversation, then the remaining communication stations are so informed and the connection continues between the remaining communication stations but if any of the original communication stations leave the connection (the second VoIP phone or the phone in the public network, in this example), then the call is disconnected and terminated. Any secondary communication station (first VoIP phone or third VoIP phone, in this example) after leaving the connection may later re-join the connection still in progress by repeating the process as described.

If a VoIP communication station such as a first VoIP phone wishes to join in an existing conversation between a second VoIP phone and a phone in a public network, the first VoIP phone may send a "join-call" signal to the VCS as described. However, if there are multiple existing conversations in progress, the VCS may determine which conversation the first VoIP phone wishes to join. Any number of methods may be used to ensure that the first VoIP phone enters the desired connection. For example, the first VoIP phone may transmit a code number indicating the desired connection such as a number corresponding to the "Nth" conversation or a specific code number corresponding to the desired second VoIP phone. Alternatively, the first VoIP phone may switch from "on-hook" to "off-hook" repeatedly until the desired connection is achieved. It should be noted that there are many methods of achieving the desired connection and the examples enumerated herein are merely illustrative and not limiting. It is envisioned that one of skill in the art may use a variety of methods without departing from the spirit and scope of the present invention.

Alternatively, there may be no existing connections when the first VoIP phone requests to join a connection. In this case, the first VoIP phone goes "off-hook" and sends a "join-call" signal as described. The VCS receives the signal from the first VoIP phone but, because there is no current existing connections to join, the VCS returns an indication signal to the first VoIP phone indicating that there is no current connections. The indication signal from the VCS may take many forms. For example, the VCS may return a "No Conversation" indication or a recorded message.

FIG. 1 illustrates an exemplary embodiment of a private network. The exemplary network illustrates two voice clients, VoIP phone A 130 and VoIP Phone B 135. It should be noted that any number of VoIP communication stations may be present in the network. Each voice client is separate and distinct and each voice client may form a connection through the Gateway 101 to a communication station in a public network such as a PSTN phone 140 through a PSTN Gateway 120.

When a call is placed from a local node, for example, a call signaling path is set up by the call agent 115. In one example, the call originates at the VoIP Phone A 130 and an off-hook signal is received at the Gateway 101 and relayed to the call agent 115. The call agent 115 responds through the Gateway 101 back to the VoIP Phone A 130 with a dialtone. The user inputs a destination number (e.g., phone number) which is relayed through the Gateway 101 to the call agent 115 through the IP network 110. Thus, the call agent 115 manages call signaling. In this example, the private network nodes such as the VoIP Phone A 130 has a unique private address and each communicates with the Gateway 101. Data is transmitted through the Gateway 101, the cable network 105 and the IP network 110 to the PSTN Gateway 120 and the destination phone 140.

Figure 2:
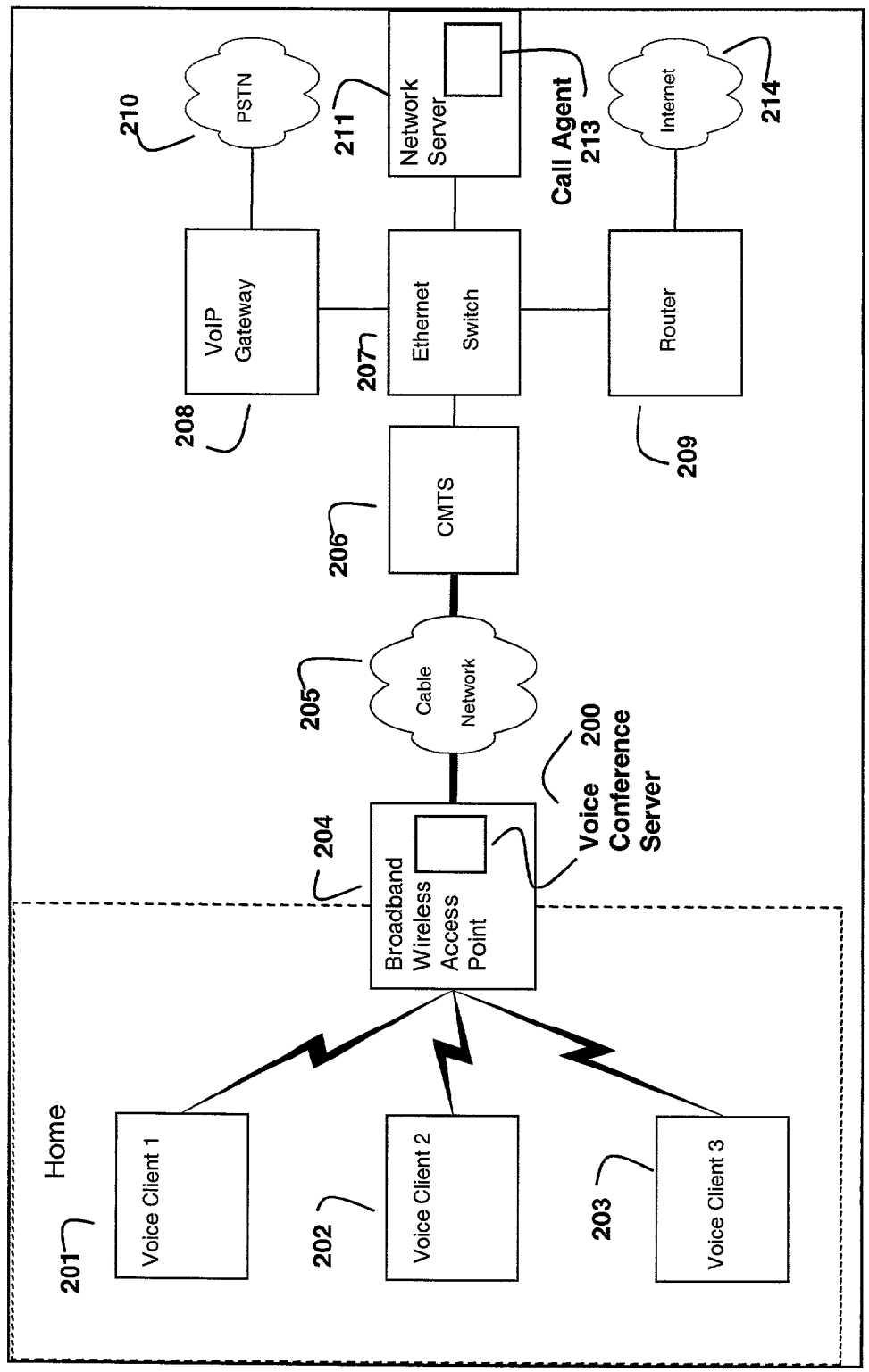
FIG. 2 is a flowchart illustrating an exemplary method for establishing VoIP conference calling of the present invention.

FIG. 2 illustrates a second exemplary embodiment of the present invention. The private network as illustrated contains local nodes that may be voice clients 201, 202, 203, for example. It is noted that the local nodes are not so limited and may be of any number. Each local node in the private network communicates with a broadband wireless access point 204 (BWAP). The BWAP 204 contains a Voice Conference Server (VCS) 200 which provides VoIP conference services in the network. The BWAP 204 connects through a cable network 205, for example, to network server 211, which contains the call agent 213. In this example, data is transmitted through the Cable Modem Termination System (CMTS) 206, Ethernet switch 207 and through a VoIP gateway 208 to the Public Switched Telephone Network (PSTN) 210. Data may also be sent through routers 209 to the Internet 214. The call agent 213 manages call signaling and recognizes the address of the VCS 200 in the BWAP 204.

Figure 3:
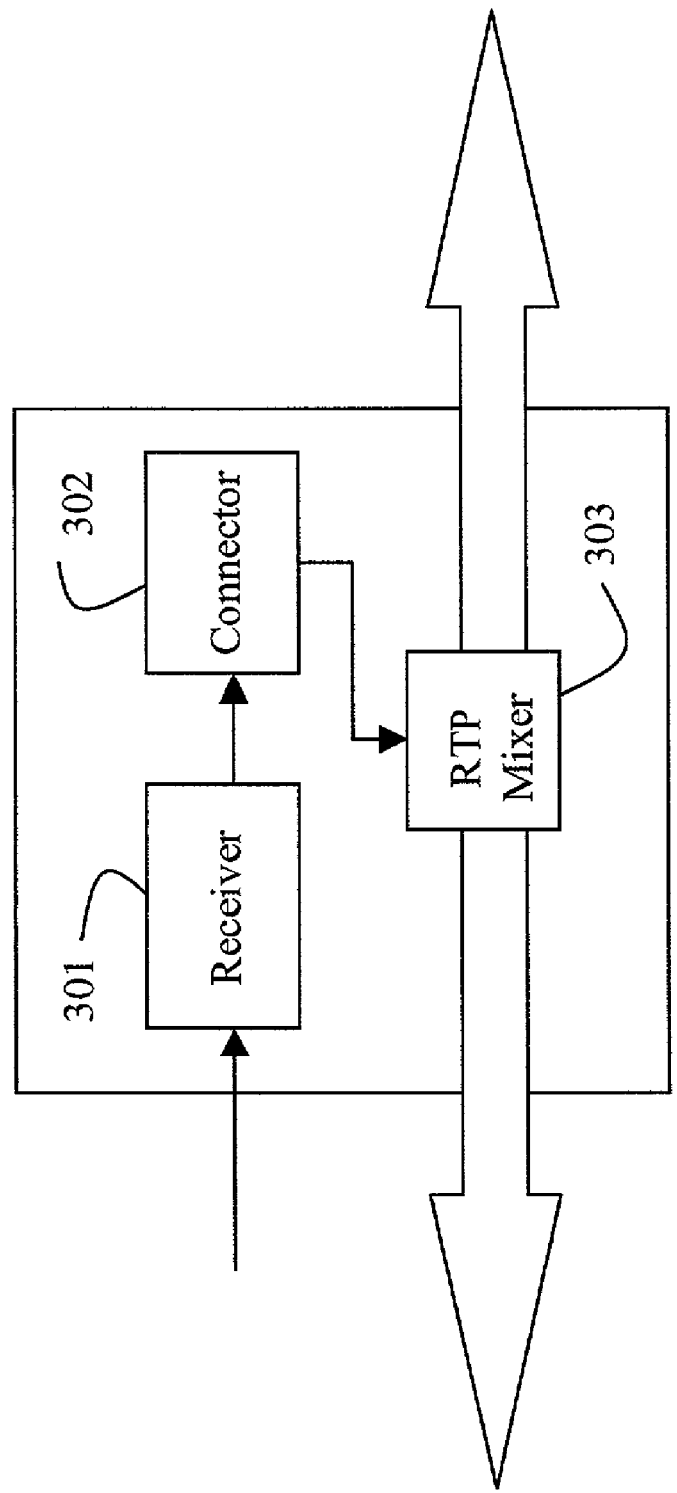
FIG. 3 illustrates an exemplary embodiment of the Voice Conference Server (VCS) 200 of the present invention.

FIG. 3 illustrates an exemplary embodiment of the Voice Conference Server (VCS) 200. The VCS 200 may contain a receiver 301 for receiving an indication or signal from a VoIP phone. For example, a VoIP phone may send a "join-call" signal to the VCS 200 indicating a desire to join in a VoIP phone conversation. The receiver 301 receives the "join-call" signal from the VoIP phone and sets up a voice path with the VoIP phone in response to receiving the signal. When the receiver 301 receives the signal, the VCS 200 sets up an RTP path for carrying voice between the VoIP phone and the Gateway and engages an RTP mixer to provide a conference call with an existing connection. The connector apparatus 302 directs the RTP mixer in response to receiving a signal from the receiver 301 such that the RTP mixer mixes packets from connected VoIP phones or the phone in the public network and delivers the mixed packets to a desired destination. For example, if a first VoIP phone sends a "join-call" signal to the VCS to join in a communication between a second VoIP phone and a phone in a public network such as a PSTN phone, the VCS 200 receives the signal from the VoIP phone through a receiver 301. The VCS acts as a proxy call agent to set up a voice path with the VoIP phone such that an RTP path for carrying voice is established between the VoIP phone and the Gateway and a conference call is established between communication stations.

The VCS may also inform a VoIP call agent that the VoIP phone joining the conference call is busy and may inform the second VoIP phone or the phone in the public network such as the PSTN phone that the first VoIP phone is joining in on the call. Likewise, if other VoIP phones in the network wish to join in on the conversation, the VCS receives a "join-call" signal from these VoIP phones and an RTP path for carrying voice is established between the new VoIP phones and the VCS. The RTP mixer mixes the voice packets from phones involved in the conference call and forwards the mixed packets to the intended destination communication station.

If, for example, the first VoIP phone wishes to leave the connection, the first VoIP phone goes "on-hook" and the VCS 200 receives an on-hook indication or signal from the first VoIP phone. In response to the on-hook indication or signal, the VCS 200 releases the connection to the first VoIP phone. Alternatively, if a communication station such as the second VoIP phone goes on-hook, the call is terminated.

Figure 4:
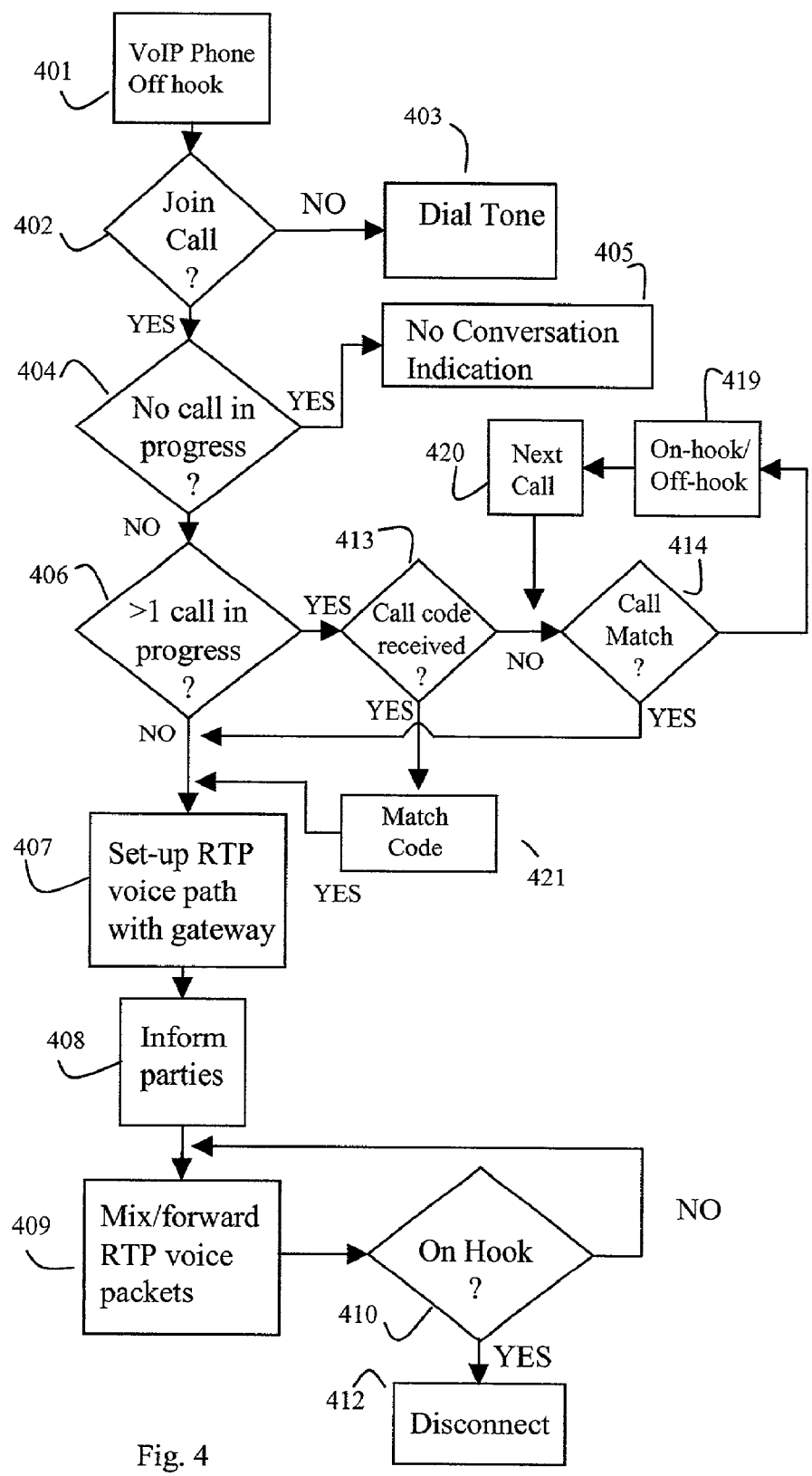
FIG. 4 is a flowchart illustrating an exemplary method in providing conferencing service in a VoIP network.

FIG. 4 is a flowchart illustrating an exemplary method in providing conferencing service in a VoIP network. A first VoIP phone goes off-hook (step 401). At step 402, the system determines if a "join-call" signal or indication is received from the first VoIP phone. If the VCS 200 does not detect a "join-call" signal (the "NO" branch of step 402), then the first VoIP phone call may not desire to join a connection in progress and may be attempting to place a VoIP call in the network and the system attempts to connect a call through the network. In this case, a normal dial tone is provided (step 403). If a "join-call" signal or indication is received from the first VoIP phone (the "YES" branch of step 402), then the system determines if there is a call in progress (step 404). If there is no call in progress (the "YES" branch of block 404), then the VCS 200 returns a signal or indication that there is no call in progress. For example, the VCS 200 may return an indication that there is no conversation (step 405). If there is a call in progress (the "NO" branch of block 404), then the VCS 200 determines there are multiple calls in progress (step 406). If there is only one call in progress in the network (the "NO" branch of step 406), then the first VoIP phone may wish to join the conversation.

If a "join-call" signal or indication is received at the VCS 200 from the first VoIP phone and there is an active connection in the network, then the VCS 200 sets up an RTP voice path for carrying voice between the first VoIP phone and the Gateway and engages an RTP mixer to mix packets from a plurality of phones and forward the mixed packets to a desired destination communication station (steps 407 and 409). The VCS 200 may inform the parties involved in the connection that the new party has entered the connection (step 408). For example, the VCS 200 may inform a second VoIP phone involved in the conversation and the phone in the public network that is involved in the conversation that the first VoIP phone has entered the conversation. The system may check if the first VoIP phone is still connected (step 410). When the first VoIP phone goes on-hook, i.e., the first VoIP phone has hung up (the "YES" branch of step 410), the system may release the connection to the first VoIP phone. If the second VoIP phone is on-hook or any of the party of the original conversation is on-hook, then the system may disconnect all parties of the conference call.

If the first VoIP phone goes off hook and a "join-call" signal or indication is received from the first VoIP phone at the VCS 200 and there are multiple calls in progress (the "YES" branch of step 406), then the system determines the desired call in which to conference the first VoIP phone. FIG. 4 illustrates an illustrative method for call selection. In one exemplary embodiment, a call code is received at the VCS 200 from the first VoIP phone (the "YES" branch of step 413), which indicates the call desired. For example, the call code may be a number N that indicates the "Nth" call or the code may be a predetermined number corresponding to preset connections but is not so limited. If a call code is received from the first VoIP, then the VCS 200 matches the code to the corresponding connection (step 421) and sets up an RTP voice path with the first VoIP phone and conferences the first VoIP phone in the connection as described (step 407). Alternatively, there may be multiple connections in the network and a "join-call" signal or indication may be received at the VCS 200 but a call code is not received from the first VoIP phone (the "NO" branch of step 413). In this case, the system determines if a first connection corresponds to the desired connection (step 414). If the connection is the desired connection, then the VCS 20 set up an RTP voice path with the first VoIP phone and conference the first VoIP phone in the connection as described (step 407). However, if the connection is not the desired connection, then an on-hook signal may be received from the first VoIP phone followed by an off-hook signal (step 419). The system may advance to the next connection selection (step 420) and determine if the next connection selection is the desired connection. The process continues until the desired connection is determined or, alternatively, if the desired connection is not found, the system may disconnect the first VoIP phone (not shown). When the desired connection is found, the VCS 200 may set up an RTP voice path with the first VoIP phone and conference the first VoIP phone in the connection as described (step 407).

It is understood that the present invention can take many forms and embodiments. The embodiments shown herein are intended to illustrate rather than to limit the invention, it being appreciated that variations may be made without departing from the spirit of the scope of the invention.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for establishing a voice over internet protocol conference call by joining a first voice over internet protocol station in a communication between a plurality of communication stations, wherein one of the plurality of communication stations is a second voice over internet protocol station in a private network and the first voice over internet protocol station is in the private network, the method comprising:

receiving an indication at a voice conference server from the first voice over internet protocol station in the private network for joining one of a plurality of existing conversations on the voice conference server between the plurality of communication stations, wherein the voice conference server is located at an access point serving the first voice over internet protocol station, wherein the plurality of existing conversations comprises voice over internet protocol calls and each one of the plurality of existing conversations is on a different connection;

setting up a connection between the voice conference server and the first voice over internet protocol station;

receiving an identification of the one of the plurality of existing conversations on the voice conference server via a code number entered by the first voice over internet protocol station corresponding to the second voice over internet protocol station after the connection between the voice conference server and the first voice over internet protocol station is set up, wherein the one of the plurality of existing conversations is between the second voice over internet protocol station in the private network and a phone in a public network, wherein the voice conference server is external to the first voice over internet protocol station and the plurality of communication stations;

establishing a real-time transport protocol voice path with the first voice over internet protocol station and the voice conference server; and managing data packet transmission between the first voice over internet protocol station and one of the plurality of communication stations via the voice conference server.

2. The method of claim 1 wherein one of the plurality of communication stations is a public switched telephone network phone.

3. The method of claim 1 wherein one of the plurality of communication stations is a voice over internet protocol phone.

4. The method of claim 1 wherein the indication comprises a switch signal from the first voice over internet protocol station.

5. The method of claim 1 further comprising informing the plurality of communication stations of a status of the first voice over internet protocol station.

6. The method of claim 1 wherein the managing data packet transmission comprises mixing data packets from the first voice over internet protocol station and one of the plurality of communication stations.

7. The method of claim 6 wherein the managing data packet transmission further comprises sending the mixed data packets to one of the plurality of communication stations.

8. The method of claim 1 wherein the managing data packet transmission comprises mixing data packets from the plurality of communication stations.

9. The method of claim 8 wherein the managing data packet transmission further comprises sending the mixed data packets to the first voice over internet protocol station.

10. The method of claim 1 further comprising indicating a busy status on the first voice over internet protocol station.

11. The method of claim 1 further comprising receiving an on-hook signal from the first voice over internet protocol station.

12. The method of claim 1 further comprising receiving an on-hook signal from at least one of the plurality of communication stations.

13. The method of claim 12 wherein the voice over internet protocol call is disconnected.

14. A device for establishing a voice over internet protocol conference call by joining a first voice over internet protocol station in a communication between a plurality of communication stations, wherein one of the plurality of communication stations is a second voice over internet protocol station in a private network and the first voice over internet protocol station is in the private network, the device comprising:

a receiver in a voice conference server for receiving an indication from the first voice over internet protocol station in the private network for joining one of a plurality of existing conversations on the voice conference server after setting up a connection between the voice conference server and the first voice over internet protocol station, wherein the voice conference server is located at an access point serving the first voice over internet protocol station, wherein each one of the plurality of existing conversations is on a different connection, wherein the indication comprises a code number entered by the first voice over internet protocol station corresponding to the second voice over internet protocol station identifying the one of the plurality of existing conversations on the voice conference server, wherein the one of the plurality of existing conversations is between the second voice over internet protocol station in the private network and a phone in a public network, wherein the voice conference server is external to the first voice over internet protocol station and the plurality of communication stations;

an apparatus in the voice conference server for setting up a real-time transport protocol voice path with the first voice over internet protocol station in response to the received signal for joining the call; and, an real-time transport protocol mixer in the voice conference server for managing at least two voice over internet protocol stations and sending the mixed data packets to at least one voice over internet protocol station.

15. The device of claim 14 further comprising a status monitor for informing a voice over internet protocol call agent of a status of the first VoIP station.

16. The device of claim 14 wherein one of the plurality of communication stations is a public switched telephone network phone.

17. The device of claim 14 wherein one of the plurality of communication stations is a voice over internet protocol phone.

18. The device of claim 14 further comprising informing the plurality of communication stations of a status of the first voice over internet protocol station.

19. The device of claim 14 wherein the managing data packet transmission comprises mixing data packets from the first voice over internet protocol station and one of the plurality of communication stations.

20. The device of claim 19 wherein the managing data packet transmission further comprises sending the mixed data packets to the one of the plurality of communication stations.

21. The device of claim 14 wherein the managing data packet transmission comprises mixing data packets from the plurality of communication stations.

22. The device of claim 21 wherein the managing data packet transmission further comprises sending the mixed data packets to the first voice over internet protocol station.

23. The device of claim 14 further comprising indicating a busy status on the first voice over internet protocol station.

24. The device of claim 14 further comprising receiving an on-hook signal from the first voice over internet protocol station.

25. The device of claim 14 further comprising receiving an on-hook signal from at least one of the second voice over internet protocol station and the at least one other station.

26. The device of claim 25 wherein the call is disconnected.

27. The device of claim 14 wherein the indication comprises a switch signal from the first voice over internet protocol station.

* * * * *